May 6, 1941.   E. W. ROUCH   2,241,163
BRAKE
Filed May 4, 1939
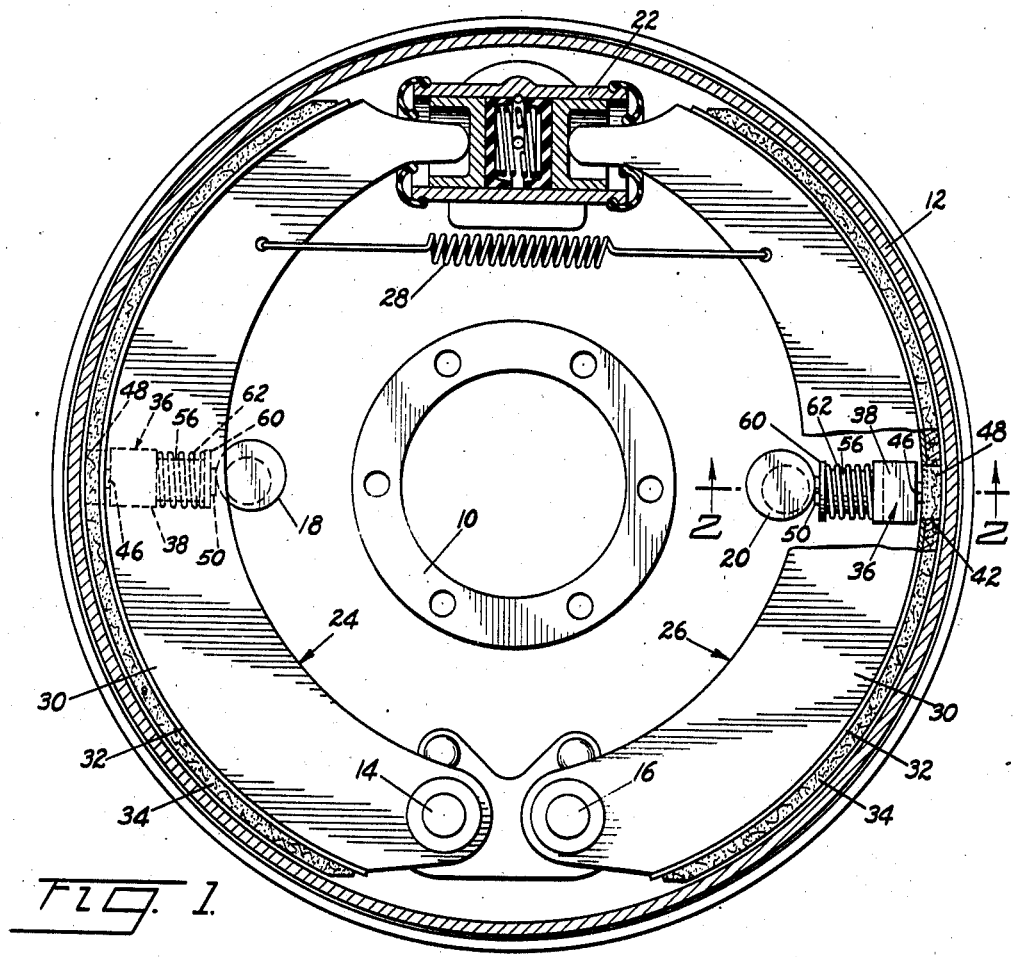
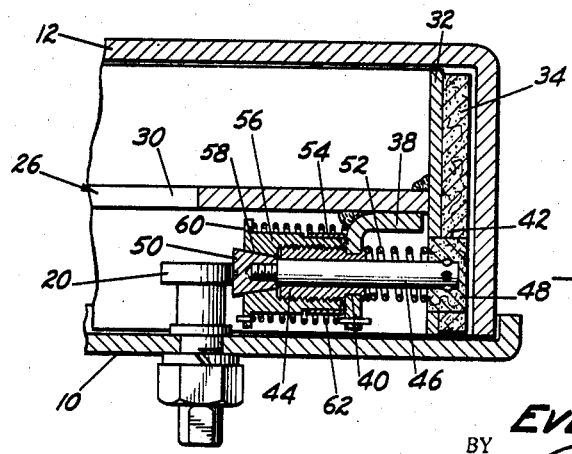
INVENTOR.
EVERETT W. ROUCH
BY C. H. Fowler
ATTORNEY.

Patented May 6, 1941

2,241,163

UNITED STATES PATENT OFFICE 2,241,163

BRAKE

Everett W. Rouch, Detroit, Mich., assignor to Hydraulic Brake Company, Detroit, Mich., a corporation of California Application May 4, 1939, Serial No. 271,811

8 Claims. (Cl. 188—79.5)

This invention relates to brakes, and more particularly to means for automatically adjusting the friction elements or shoes or brakes.

An object of the invention is to provide means operative to automatically adjust the friction elements of a brake so as to compensate for wear of the linings of the friction elements.

Another object of the invention is to provide means for automatically adjusting the friction elements of a brake controlled by wear of the linings of the friction elements.

An additional object of the invention is the provision of a device of this character that will be simple and inexpensive in construction, highly efficient in use, positive in action, durable in service, and a general improvement in the art.

Other objects of the invention will appear from the following description taken in connection with the accompanying drawing forming a part of this specification, and in which—

Fig. 1 is a vertical sectional view of a brake embodying the invention; and

Fig. 2 is an enlarged sectional view taken substantially on line 2—2, Fig. 1, looking in the direction indicated.

In the illustrated embodiment of the invention, 10 represents a fixed support or backing plate adapted to be secured to an axle or to an axle housing, and associated with the backing plate is a rotatable drum 12 adapted to be secured to a wheel.

The backing plate has suitably arranged thereon spaced anchors 14 and 16, conventional retractile stops 18 and 20, and a fluid pressure actuated motor 22 adapted to be connected to a suitable source of fluid pressure. A pair of corresponding friction elements or shoes 24 and 26 have their articulate ends pivoted on the anchors 14 and 16, and the force applying ends of the shoes are urged into engagement with the pistons of the motor 22 by a retractile spring 28 connecting the shoes.

Each of the shoes includes a web 30 supporting a rim 32 having secured thereon a friction lining 34 suitable for cooperation with the drum, and each shoe supports an automatic adjuster indicated generally at 36. As shown, a bracket 38 suitably secured to the web 30 of the shoe has an opening 40, and arranged in the rim 32 and lining 34 of the shoe is an opening 42 concentrically disposed with relation to the opening 40. A sleeve 44 has one of its ends suitably secured in the opening 40 and its other end extended from the bracket inwardly of the brake. A rod 46 reciprocable in the sleeve 44 has on one end thereof a head 48 fitted for movement in the opening 42. The head 48 is preferably formed from a material having a lower coefficient of friction than that of the friction lining 34 of the shoe. On the other end of the rod 46 is a detachable frusto-conical head 50 for cooperation with the adjacent retractile stop, and a compression spring 52 interposed between the head 48 and the bracket 38 urges the head 48 toward the drum.

A sleeve 54 fixedly secured to the bracket 38 extends therefrom concentrically of the sleeve 44, and a thimble 56 threaded on the sleeve 44 has a reduced portion received by the sleeve 54 so as to exclude dust and other foreign substances from the threads. The head of the thimble has an axially disposed conical opening providing a chuck 58, for the reception of the frusto-conical head 50 on the rod 46, and a circumferential flange 60, and a torsion spring 62 sleeved on the thimble has one of its ends connected to the flange 60 and its other end connected to the bracket 38 so that upon movement of the frusto-conical head 50 from its seat on the chuck 58 the thimble is turned to follow up the head 50.

In a normal braking operation, upon energization of the motor 22 the friction elements or brake shoes 24 and 26 are moved to engage the friction linings 34 thereon with the drum 12, and simultaneously therewith the heads 48 on the rods 46 of the automatic adjusters also engage the drum. The linings on the shoes are subjected to the usual wear incident to a braking operation, and the wear on the heads 48, due to their low coefficient of friction, is negligible. Because of this differential of wear, there is, during a normal braking operation, relative movement between the shoes and the adjusters.

As the linings on the shoes wear, the heads 48 on the rods 46 are depressed against the resistance of the springs 52. This results in movement of the frusto-conical heads 50 from their seats on the chuck 58 in the heads of the thimbles 56, whereupon the torsion springs 62 turn the thimbles to follow up the heads 50, so that upon conclusion of a braking operation and return of the shoes to retracted position under the influence of the retractile springs 28 the frusto-conical heads 50 on the rods 46 of the adjusters may engage the retractile stops 18 and 20 and support the shoes in proper spaced relation to the drum.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. A brake comprising a friction element, a retractile stop therefor, a member mounted on and movable relative to the element for cooperation with the stop, a head on the member, and a rotatable chuck for cooperation with the head inhibiting movement of the member in one direction.

2. A brake comprising a friction element, a retractile stop therefor, a member mounted on and movable relative to the element, a wear-resisting head on one end of the member, a tapered head on the other end of the member cooperating with the stop, and an extensible chuck cooperating with the tapered head to inhibit movement of the member in one direction.

3. A brake comprising a friction element, a retractile stop therefor, a member slidably supported on the element, a wear-resisting head on one end of the member, a frusto-conical head on the other end of the member having a part cooperating with the stop, and an automatically extensible chuck for cooperation with the frusto-conical head.

4. A brake comprising a friction element, a retractile stop therefor, a sleeve secured to the element, a rod slidable in the sleeve, a wear-resisting head on one end of the rod, a tapered part on the other end of the rod cooperating with the stop, and a chuck mounted for travel on the sleeve and operative to automatically follow up the tapered part.

5. A brake comprising a movable member, a friction element for cooperation therewith, a retractile stop for the element, a sleeve secured to the element, a rod slidable in the sleeve, a head on one end of the rod for cooperation with the movable member, a head on the other end of the rod for cooperation with the stop, and a spring-pressed member cooperating with the last-mentioned head for resisting movement of the rod in one direction.

6. A brake comprising a movable member, a friction element for cooperation therewith, a retractile stop for the element, a sleeve secured to the element, a rod slidable in the sleeve, a wear-resisting head on one end of the rod for cooperation with the movable member, means for urging the wear-resisting head into engagement with the movable member, a frusto-conical head on the other end of the rod cooperating with the stop, a member on the sleeve having an opening receiving the frusto-conical head, and means for urging the member into engagement with the frusto-conical head.

7. A brake comprising a fixed support, a rotatable drum associated therewith, a friction element on the support for cooperation with the drum, a retractile stop for the element, a bracket on the friction element, a sleeve supported by the bracket, a rod slidable in the sleeve, a wear-resisting head on the rod cooperating with the drum, a spring interposed between the bracket and the wear-resisting head, a frusto-conical head on the other end of the rod cooperating with the stop, a thimble threaded on the sleeve having an opening providing a chuck for the reception of the frusto-conical head, and a torsion spring connecting the thimble to the bracket.

8. A brake comprising a fixed support, a rotatable drum associated therewith, a pair of friction elements mounted on the support for cooperation with the drum, retractile stops for the friction elements, an adjusting device on each of the friction elements, each device including a bracket secured to the friction element, a sleeve supported by the bracket, a rod slidable in the sleeve, a wear-resisting head on one end of the sleeve adapted to engage the drum, a spring interposed between the wear-resisting head and bracket, a frusto-conical head on the other end of the rod adapted to engage the stop, a dust shield secured to the bracket concentrically of the sleeve, a thimble threaded on the sleeve having an opening receiving the frusto-conical head and a reduced portion receiving the dust shield, and a torsion spring sleeved over the thimble and dust shield and connecting the thimble to the bracket.

EVERETT W. ROUCH.